United States Patent
Deshpande

(10) Patent No.: US 8,693,478 B2
(45) Date of Patent: Apr. 8, 2014

(54) MULTIPLE SHORTEST-PATH TREE PROTOCOL

(75) Inventor: Sushrut Sudhakar Deshpande, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 13/421,949

(22) Filed: Mar. 16, 2012

(65) Prior Publication Data

US 2013/0242998 A1    Sep. 19, 2013

(51) Int. Cl.
  *H04L 12/28* (2006.01)
  *H04L 1/00* (2006.01)
  *G06F 15/16* (2006.01)

(52) U.S. Cl.
  USPC ............ 370/392; 370/256; 370/401; 709/238

(58) Field of Classification Search
  None
  See application file for complete search history.

(56) References Cited

U.S. PATENT DOCUMENTS

| | | | |
|---|---|---|---|
| 6,813,250 B1 | 11/2004 | Fine et al. | |
| 6,937,576 B1 | 8/2005 | Di Benedetto et al. | |
| 2001/0025318 A1* | 9/2001 | Higashiyama | 709/238 |
| 2003/0053422 A1* | 3/2003 | Ambe | 370/256 |
| 2008/0056164 A1* | 3/2008 | Stratton et al. | 370/260 |
| 2008/0219149 A1* | 9/2008 | Yoo | 370/217 |
| 2008/0219187 A1* | 9/2008 | Zou | 370/256 |
| 2008/0232275 A1* | 9/2008 | Eswaran et al. | 370/256 |
| 2010/0040060 A1* | 2/2010 | Gleeson | 370/392 |
| 2010/0195661 A1* | 8/2010 | Thottakkara | 370/401 |
| 2010/0284309 A1* | 11/2010 | Allan et al. | 370/256 |
| 2011/0280159 A1* | 11/2011 | Miller | 370/256 |
| 2012/0014386 A1* | 1/2012 | Xiong et al. | 370/392 |
| 2012/0044837 A1* | 2/2012 | Ibanez Fernandez et al. | 370/256 |

* cited by examiner

*Primary Examiner* — Clemence Han
(74) *Attorney, Agent, or Firm* — Edell, Shapiro & Finnan, LLC

(57) ABSTRACT

In accordance with on example, a control packet from a first network device is received at a second network device. The control packet comprises, embedded in a source address field of the control packet, control information for a spanning tree associated with a root network device. The control information is extracted from the source address field of the control packet in order to populate a shortest-path forwarding table. A data packet from the first network is then received by the second network device. Based on the shortest-path forwarding table and a media access control (MAC) address table, a host device to which the data packet is directed is identified. Finally, based on the information in the shortest-path forwarding table and the MAC address table, the data packet is forwarded to a network device directed connected to the host device.

23 Claims, 11 Drawing Sheets

| 135 | 140 | 145 | 150 | 155 | 160 |
|---|---|---|---|---|---|
| ROOT | BRIDGE | RECEIVED COST | RECEIVED FLAGS | MYSENTFLAGS | INTERFACE |
| | | | | | |
| | | | | | |

SHORTEST-PATH TABLE

FIG.4

| 165 | 170 |
|---|---|
| ROOT | MYSENT COST |
| | |
| | |

SENT-COST TABLE

FIG.5

MULTIPLE SHORTEST-PATH TREE PROTOCOL

TECHNICAL FIELD

The present disclosure relates to forwarding traffic in a network.

BACKGROUND

Many organizations, including businesses, governments, and educational institutions utilize computer networks that connect to a plurality of computing devices. The computing devices may be at the same or different locations and may be, for example, computers, servers, etc. Common types of computer networks include local area networks (LANs) and wide area networks (WANs).

In computer networks, one or more intermediate network devices (i.e., switches, bridges, routers, etc.) are often used to connect together the computing devices. Between the various intermediate network devices and the computing devices are wired or wireless connections, referred to herein as links. One or more consecutive links form a communication path that is usable to transfer information (in the form of packets) between the computing devices. Most computer networks include redundant communications paths so that a failure of any given link does not isolate any portion of the network. Such networks are typically referred to as meshed or partially meshed networks. However, the existence of redundant links may result in the formation of circuitous paths or "loops" within the network. Loops are undesirable because packets may, potentially, traverse the loops indefinitely. Furthermore, some intermediate network devices, such as bridges or switches, replicate frames whose destination is not known, thereby resulting in a proliferation of packets along the loops. In such circumstances, the resulting traffic may effectively overwhelm the network.

To avoid the formation of loops, most intermediate network devices execute spanning tree techniques that allow the network devices to calculate an active network topology that is loop-free (i.e., a tree) and yet connects the computing devices within the network (i.e., the tree is spanning). The Institute of Electrical and Electronics Engineers (IEEE) has promulgated a standard (the 802.1D standard) that defines a spanning tree protocol to be executed by 802.1D compatible devices.

BRIEF DESCRIPTION OF THE DRAWINGS

FIG. 4 is a schematic diagram of a shortest-path forwarding table used in accordance with the MSPT protocol.

FIG. 5 is a schematic diagram of a sent-cost table used in accordance with the MSPT protocol.

DESCRIPTION OF EXAMPLE EMBODIMENTS

Overview

Generally methods, apparatuses and computer readable storage media are provided herein for creation and subsequent use of spanning trees based on source address information. In accordance with on example, a control packet from a first network device is received at a second network device. The control packet comprises, embedded in a source address field of the control packet, control information for a spanning tree associated with a root network device. The control information is extracted from the source address field of the control packet in order to populate a shortest-path forwarding table. A data packet from the first network is then received by the second network device. Based on the shortest-path forwarding table and a media access control (MAC) address table, a host device to which the data packet is directed is identified. Finally, based on the information in the shortest-path forwarding table and the MAC address table, the data packet is forwarded to a network device directly connected to the host device. Directly connected network device to end host will forward the packet to the destination host.

Example Embodiments

Figure 1:
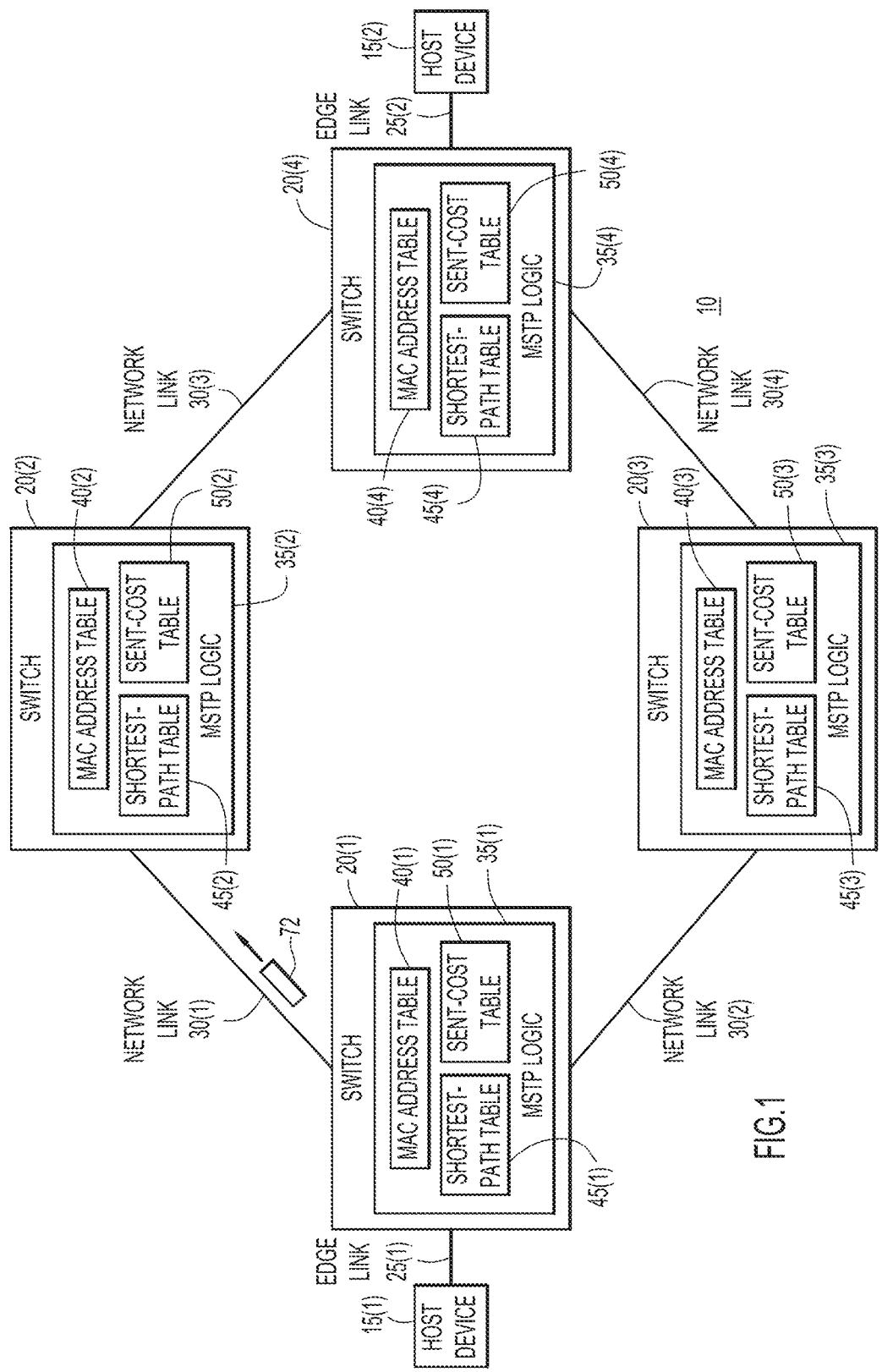
FIG. 1 is a block diagram of a computing network in which spanning trees are created in accordance with a multiple shortest-path tree (MSPT) protocol.

FIG. 1 is a block diagram of a packet switching computer network 10 that comprises a first host computing device 15(1), a second host computing device 15(2), and a plurality of intermediate network devices 20(1)-20(4). In this example, network 10 is an Ethernet local area network (LAN) and intermediate network devices 20(1)-20(4) are switches.

Computer network 10 enables host devices 15(1) and 15(2) to communicate, share resources, etc., through the exchange of data packets. Host devices 15(1) and 15(2) may be, for example, computers, servers, peripheral devices, etc. Data packets are transferred (routed) from a source host device (source) to a destination host device (destination) through the use of the switches 20(1)-20(4). In other words, switches 20(1)-20(4) are network devices that use a combination of hardware and/or software to direct packets through the network 10.

Host device 15(1) is connected to switch 20(1) via a wired connection (link) 25(1), while host device 15(2) is connected to switch 20(4) via a similar wired link 25(2). Links 25(1) and 25(2) are referred to herein as edge links because they are located at the edge of the computer network 10 (i.e., between a host device and an intermediate network device). Switches 20(1)-20(4) are interconnected with one another via wired links 30(1)-30(4) referred to herein as network links. More specifically, network link 30(1) connects switches 20(1) and 20(2), network link 30(2) connects switches 20(1) and 20(3), network link 30(3) connects switches 20(2) and 20(4), and network link 30(4) connects switches 20(3) and 20(4). A consecutive sequence of links collectively form a communication path over which data packets are sent. As used herein, data packets may include, for example, video data, numeric data, alphanumeric data, voice data, etc.

Computer network 10 includes redundant communication paths between host devices 15(1) and 15(2) such that a failure of any given link 30(1)-30(4) does not isolate either host device. For example, a first communication path includes links 30(1) and 30(3) while a second communication path includes links 30(2) and 30(4). The existence of these redundant communication paths may result in the formation of circuitous paths or "loops" within the network 10. Loops are undesirable because packets may, potentially, traverse the loops indefinitely. Furthermore, in certain circumstances, switches 20(1)-20(4) replicate frames whose destination is not known, thereby resulting in a proliferation of packets along the loops. The resulting traffic may effectively overwhelm the network 10.

To avoid the formation of loops, switches 20(1)-20(4) are configured to utilize a new spanning tree protocol, referred to as the multiple shortest-path tree (MSPT) protocol, to calculate an active network topology that is loop-free and yet redundantly connects the host devices 15(1) and 15(2). The MSPT protocol is executed through the use of MSPT logic 35(1), 35(2), 35(3), and 35(4), in each of switches 20(1), 20(2), 20(3), and 20(4), respectively.

For ease of reference, the example of FIG. 1 will be primarily described with reference to MSPT logic 35(1) and specific reference will not be made to the elements of MSPT logic 35(2), 35(3), and 35(4). MSPT logic 35(1) includes a media access control (MAC) address forwarding table 40(1), a shortest-path forwarding table 45(1), and a sent-cost table 50(1). MSPT logic 35(1), as well as MSPT logic 35(2)-35(3), may be implemented in any combination of software and/or hardware (e.g., as part of an application specific integrated circuit (ASIC)). Further details of the operation of the MSPT logic and use of the MAC address forwarding tables, the shortest-path forwarding tables, and the sent-cost tables is provided below.

As noted above, there are two types of links in the example of FIG. 1; edge links 25(1)-25(2) and network links 30(1)-30(4). Edge links 25(1)-25(2) and network links 30(1)-30(4) are each full duplex (i.e., simultaneous two-way communication is permitted on the links). Because the MSPT protocol is primarily used for communication on the network links 30(1)-30(4), edge links 25(1)-25(2) may be detected (i.e., differentiated from the network links) by the absence of the MSPT protocol. The edge links 25(1)-25(2) could also be explicitly configured. Similarly, network links 30(1)-30(4) may be detected (i.e., differentiated from the edge links) by the existence of the MSPT control packets described below.

In a spanning tree protocol, such as the MSPT protocol, each of the switches 20(1)-20(4) will create a spanning tree over which traffic is forwarded in certain circumstances (i.e., broadcast, multi-cast, etc.). In this example, each of switches 20(1)-20(4) is the "root" of its own spanning tree and, as such, the number of spanning trees will be equal to the number of switches 20(1)-20(4). As described further below, each spanning tree will be uniquely identified by a root identifier (root-id).

It is to be appreciated that the computer network 10 of FIG. 1 is provided for illustration purposes only. The MSPT protocol and related techniques may be executed in other networks that have more or less complex topologies.

Referring to FIG. 1, host device 15(1) first attempts to transmit a packet to host device 15(2). When such a packet is to be sent to the end host device 15(2), the packet is directed to the switch that is directly connected to the host device 15(2) (i.e., switch 20(4)). More specifically, in accordance with an example forwarding process, a switch will know where to forward a received packet (i.e., the destination of the packet) by examining the MAC address in the packet and a MAC address forwarding table and a shortest-path forwarding table stored on the switch. However, before a packet can be correctly forwarded, the MAC address table and shortest-path table should be populated. Additionally, in some circumstances, a packet may be, for example, flooded, broadcast, multi-cast, etc., from a switch. As noted above, due to the potential for loops and circuitous forwarding, such forwarding will only occur on a specific spanning tree. In order to correctly forward in this manner, spanning trees are created for the network. The MSPT techniques are first described below with reference to the creation of the spanning trees and the population of the shortest-path forwarding table and the MAC address table.

In accordance with the MSPT techniques described herein, the control information that is used by the switches 20(1)-20(4) to create the spanning trees is carried in the source MAC address field of special frames/packets. That is, in contrast to conventional spanning tree protocols that use extra tags or messages appended to a packet, in the spanning tree creation techniques suggested herein, the source MAC address field of a transmitted packet is modified to include the control information associated with the spanning tree being created. For ease of reference, the following examples are described with reference to the creation of a spanning tree for switch 20(1).

Figure 2A:
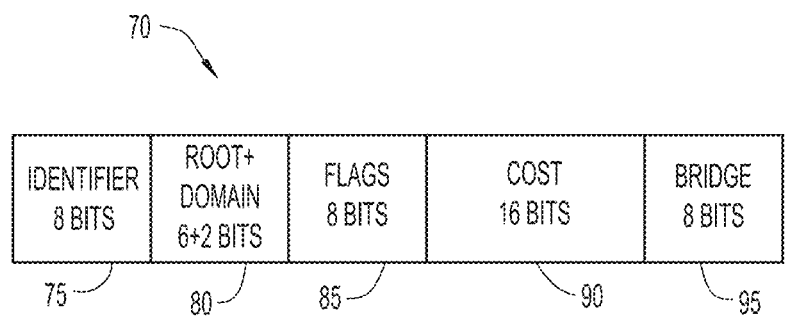
FIG. 2A is a schematic diagram of a source media access control (MAC) address field utilized to create a spanning tree in accordance with the MSPT protocol.

FIG. 2A is a schematic diagram of the format of a source MAC address field 70 in accordance with the MSPT techniques. This source MAC address field 70 and associated packet is generated by switch 20(1) directly connected to host device 15(1). In order to ensure that all other switches 20(2)-20(4) are made aware of and implement the spanning tree for switch 20(1), the control information (i.e., the packet having the source MAC address field of FIG. 2A) is send to the other switches 20(2)-20(4). FIG. 1 illustrates an example control packet 72 sent from switch 20(1) to switch 20(2).

In accordance with the example MSPT techniques, the source MAC address field 70 has a 48 bit length that includes the information that is to be stored in the database (tables) on each of the switches 20(1)-20(4) in order to properly forward later received packets along the spanning tree associated with switch 20(1). The first item in source MAC address field 70 is an eight (8) bit identifier 75. This identifier 75 indicates to later receiving switches 20(2)-20(4) that the source MAC address field 70 does not contain an actual MAC address corresponding to a device (i.e., an address for forwarding traffic), but rather that the source MAC address field 70 contains control information for creation of a spanning. That is, when a later switch recognizes this identifier 75, the switch determines that this is a control packet and that the switch should not store this address in the MAC address table. Rather, the switch will send the control information to the control plane. This identifier is the first byte of the source MAC address field 70.

Source MAC address field 70 also includes an eight (8) bit Root+Domain segment 80. The first six (6) bits of this segment 80 include the root identifier (i.e., the identifier for the root switch). The root identifier is the identifier of the switch that forms the root of the spanning tree being created (e.g., switch 20(1)). Furthermore, in the present MSPT example, the network is divided into discrete logical areas referred to as domains. This logical division allows for network scaling and keeps the databases (tables) in the switches to manageable sizes. As such, the last two (2) bits in segment 80 identify the domain of the root switch.

Source MAC address field 70 also includes an eight (8) bit flag segment 85 that includes a plurality of flags. Such flags are not used in convention arrangements and further details of the flags are provided below with reference to FIG. 2B. A sixteen (16) bit cost segment 90 is also included in the source MAC address field 70. Cost segment 90 is used to identify the shortest path to the root of the subject spanning tree (i.e., the complete cost from the current switch to the root). This value is zero if the sender itself is the root. That is, the cost is zero at switch 20(1) because switch 20(1) is the root and there is no cost for the switch to reach itself.

Finally, source MAC address field 70 includes an eight (8) bit bridge identifier 95. The bridge identifier 95 identifies the bridge (network device) for the particular root (i.e., which device sent the control information).

Figure 2B:
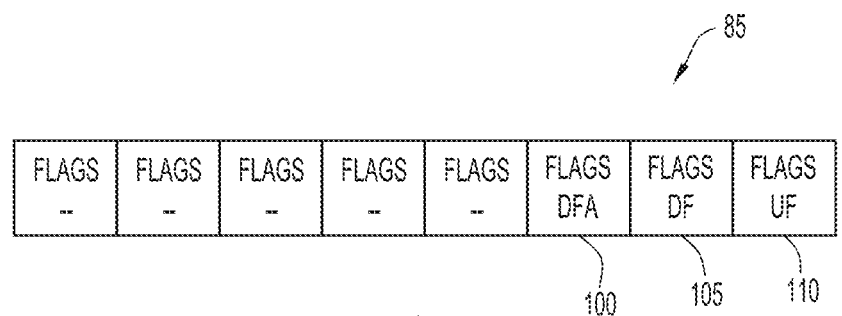
FIG. 2B is a schematic diagram of the flags utilized in the source MAC address field of FIG. 2A.

FIG. 2B is a schematic diagram of one example of flag segment 85 of FIG. 2A. In this example, although flag segment 85 is eight bits long, only three bits are used as flags. More specifically, included in flag segment 85 is a first flag referred to as the downstream forwarding (DF) bit 105. The DF bit 105 is set if the sender device is nearest to the root on the current link. That is, on link 30(1) for the root of switch 20(1), the DF bit 105 would be set. Also included in flag segment 85 is a second flag referred to as the upstream forwarding (UF) bit 110. The UF bit 110 is set when the sender device has found the link nearest to the root. That is, the UF bit 110 is set if the sender finds that the present link is the shortest path to take towards the root. The third flag in flag segment 85 is the DF acknowledge (DFA) bit 100 which is set if the sender accepts the other switch on this link as being closer to the root than itself. In such cases, the sender may forward the traffic towards the root using the current link. It is to be appreciated that the DFA bit 100 and the UF bit 110 are mutually exclusive. As such, if the UF bit 110 is set then the DFA bit 100 cannot be set.

As noted in FIG. 1, three databases or tables in each switch 20(1)-20(4) may be used in the MSPT protocol. The details of such tables will be described with reference to the tables of switch 20(1) without making specific reference to the tables of switches 20(2)-20(4).

Figure 3:
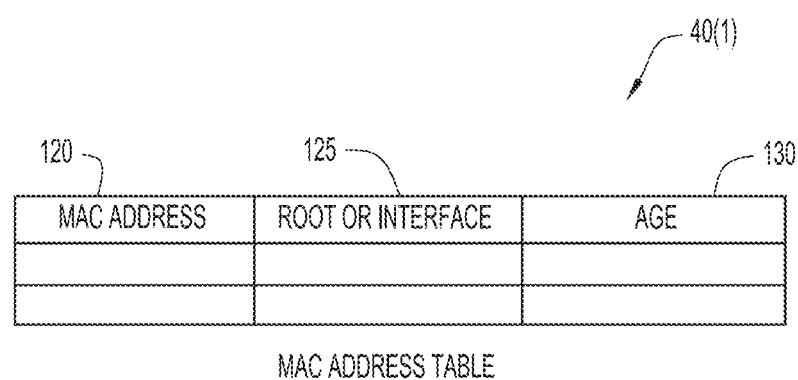
FIG. 3 is a schematic diagram of a MAC address forwarding table used in accordance with the MSPT protocol.

A first table used in accordance with the MSPT protocol is the MAC address forwarding table 40(1) shown in detail in FIG. 3. The MAC address forwarding table 40(1) includes a first column 120, a second column 125, and a third column 130. The first column 120 includes a MAC address and the second column 125 indicates if the corresponding MAC address in column 120 (i.e., the MAC address in the same row) is directly connected to another switch or it is directly connected to an interface on the same switch (itself). That is, column 125 is a field of bits that identify whether the corresponding MAC address points to an interface or to a root (i.e., a switch). A MAC address that is identified (learned) on edge ports will have an interface identifier in the second column 125, while a MAC address learned on non-edge ports will have the root identifier in column 125. The third column 130 indicates the age of the corresponding MAC address in column 120.

A second table is used in accordance with the MSPT protocol is the shortest-path table 45(1). The shortest path table 45(1) includes six (6) columns, namely Root+Domain column 135, Bridge+Domain column 140, received cost column 145, received flags column 150, mysentflags column 155, and an interface column 160.

A Third Table referred to above as the sent-cost table 50(1). The sent-cost table 50(1), shown in detail in FIG. 5, has a first column 165 for the root identifier, and a second column 170 for the calculated cost to reach that root from the switch (i.e., mysentcost). In other words, the mysentcost value is the cost to reach the root switch from the current switch.

In accordance with one specific example, when switch 20(1) initializes (i.e., boots up), the switch will determine a unique bridge identifier. The bridge identifier may be generated by the switch 20(1) or may be assigned manually by a network administrator. The bridge identifier is determined at the initialization of the switch. The bridge identifier is also the root identifier for the spanning tree to which this bridge is the root switch. An entry will then be created in the shortest-path table of switch 20(1) for its own tree. For this entry, the cost will be zero (i.e., there is no cost to reach itself), the DF bit is set in the received flags, and the interface identifier field is set to zero. An entry for its own tree may be created in sent cost table 50(1) with mysent cost value equal to zero. A device may choose not to create an entry in sent cost table for itself provided it results in same mysent cost that is zero.

A control packet having the source MAC address field 70 is created and sent on all links by a first switch (e.g., switch 20(1)). In operation, when the control packet is created and sent, an entry for the corresponding root and outgoing interface will be examined. A sent bridge identifier will be the bridge identifier of the sending switch and the sent root identifier will be root of that tree. Additionally, the sent cost will be shortest root cost from the entry for the corresponding root in the sent cost table 50(1). The sent flags will be taken from the mysentflags field of the entry for the outgoing interface and the corresponding root in the shortest-path table 45(1). If there is no entry for that interface and/r the root, then the DFA flag 100 and the UF flag 110 are set to zero and the DF flag 105 is set to one. The results of this process could be cached regenerated following a detected change in entries. Therefore, as switch 20(1) comes up, it will create a control packet for itself (that includes the source MAC address field 70) and begin creation of spanning tree that has switch 20(1) as its root. The generated control packet is then sent to the other switches (e.g., switch 20(2)) for subsequent use and completion of the spanning tree for switch 20(1). The other switches will update the various fields (i.e., cost segment 90, flags segment 85, etc.) as the packet is forwarded through the network.

Initially, a switch 20(1) will only send out the control packet having the source MAC address field 70 (for a particular root) to its own tree because those are the only other switches known to the switch 20(1). However, as the switch 20(1) learns other trees, the packet having the source MAC address field 70 will be sent for those trees as well so that all switches become aware of all spanning trees (via the control information) that are in the network. In one example, it is possible to combine control packets for different roots into a larger frame.

Figure 12:
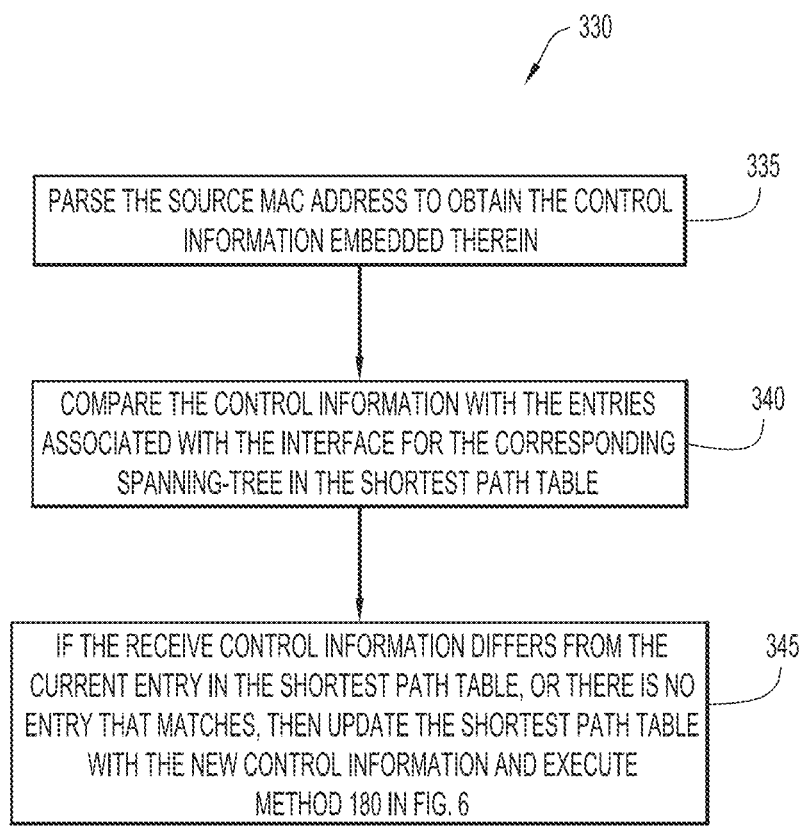
FIG. 12 is a flowchart of a method for creation of a spanning tree using the MSPT protocol.

When a control packet with the source MAC address field 70 of FIG. 2A is received by a switch, such as switch 20(1)-20(4), method 330 will be used to process the packet. FIG. 12 is a flow chart illustrating further details of a method 330 to process a received control packet. The control packet is identified by a destination MAC-address and the first byte of the source Mac-address. At 335, the source MAC address is parsed to obtain control information embedded therein. At 340, the control information is compared with the entries associated with the interface for the corresponding spanning-tree in the Shortest Path Table. If the receive control information differs from the current entry in the shortest path table, or there is no entry that matches, then at 345 the shortest path table is updated with the new control information. After this is completed, method 180 (shown in FIG. 6) is executed. If the received control information is the same as the current entry in the shortest path table, then no further actions are taken.

Figure 6:
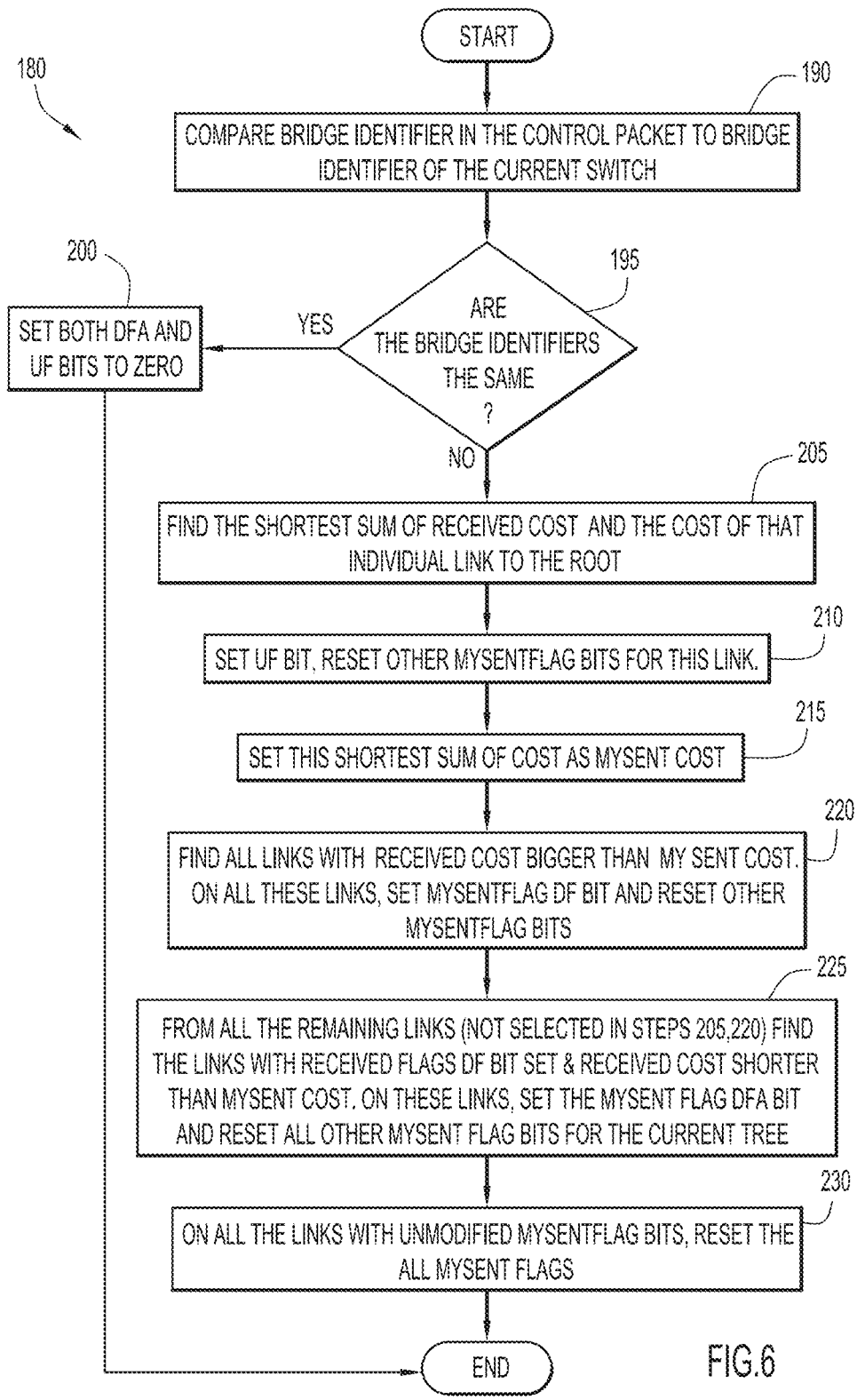
FIG. 6 is a flowchart of an example method for calculating a sent-cost for storage in the sent-cost table of FIG. 5 and for modifying mysent flags in shortest-path table of FIG. 4.

FIG. 6 is a flowchart illustrating further details of a method 180 for calculating the mysentflag values of column 155 in the shortest-path table 45(1) and the mysentcost values of column 170 in the sent cost table 50(1). Method 180 is performed at a switch, referred to herein as the current switch, after a control packet having the MSPT source MAC address field (i.e., the source MAC address field of FIG. 2A) is received and any information, as needed, is added to the shortest-path table.

At 190, the bridge identifier in the control packet is compared to the bridge identifier of the current switch. If, at 195, it is determined that the bridge identifiers are the same, method 180 proceeds to 200 where the DFA and UF bits of the control packet are set to zero and the method 180 ends.

If the bridge identifiers are not the same, method 180 proceeds to 205 where the shortest sum of the received cost and the cost of an individual link to the root is determined (by referencing other entries in table 45(1)). This is performed using only entries in the tables with DF bit set in the received flags column 150. If there are multiple entries with the shortest path, the bridge identifier is used as a tie breaker. If the received bridge identifiers are the same, then the interface identifier is used as tie breaker. For the identified link, at 210 the UF bit is set and the other mysentflag bits for this link are reset to zero. At 215, this shortest sum is set as mysentcost. If no link has a DF bit set in the received flags, then mysentcost is set to the maximum (i.e., all bits set to 1).

Next, at 220, all links with a received cost that is larger than the above calculated mysentcost (i.e., shortest cost found at 205) are identified. On all of these links the mysentflag DF bit is set and all other mysentflag bits are reset to zero. At 225, From all the remaining links(not selected in step 205,220) find links with received flags DF bit set and received cost shorter than mysent cost (i.e., the shortest cost found at 205). On these links, the mysent flag DFA bit is set and all other mysent flag bits for the current tree are reset. At 230, on all the links with an unmodified mysentflag bits, all mysentflags are reset.

This control packet may be sent periodically and is identified using a unique multicast designated MAC address. At initialization, each switch will only be aware of the tree to which it is root and, accordingly, will only send out this control packet for this tree. As the switch becomes aware of more trees, the control packet will also be sent on those trees.

Figure 7:
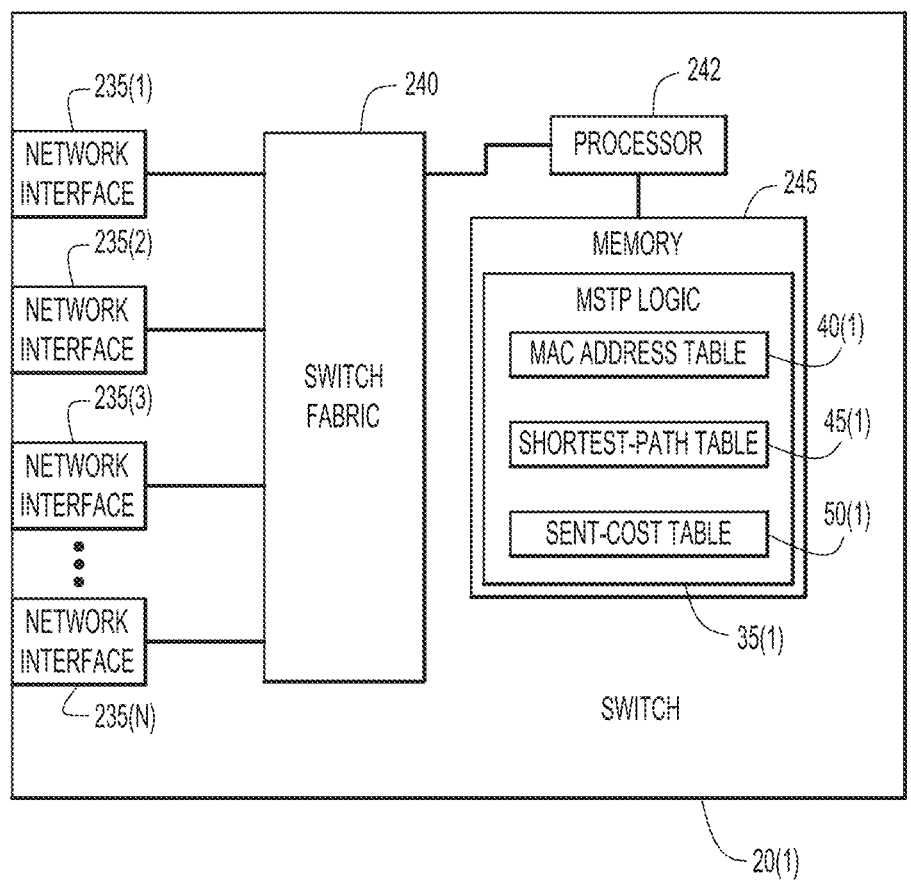
FIG. 7 is a block diagram of a switch configured to direct data traffic in accordance with the MSPT protocol.

FIG. 7 is a block diagram illustrating further details of switch 20(1) of FIG. 1 configured to execute the MSPT protocol. Switch 20(1) comprises a plurality of network interfaces (ports) 235(1)-235(N), a switch fabric 240, a processor 242, and a memory 245. Memory 245 comprises MSPT logic 35(1); including MAC address forwarding table 40(1), shortest-path table forwarding 45(1), and sent-cost table 50(1).

Memory 245 may comprise read only memory (ROM), random access memory (RAM), magnetic disk storage media devices, optical storage media devices, flash memory devices, electrical, optical, or other physical/tangible memory storage devices. The processor 242 is, for example, a microprocessor or microcontroller that executes instructions for the MSPT logic 35(1). Thus, in general, the memory 245 may comprise one or more tangible (non-transitory) computer readable storage media (e.g., a memory device) encoded with software comprising computer executable instructions and when the software is executed (by the processor 242) it is operable to perform the operations described herein in connection with MSTP logic 35(1).

In the example of FIG. 2, MSPT logic 35(1) is primarily implemented as software in switch 20(1). However, it is to be appreciated that execution of the MSPT protocol creates a lightweight spanning tree that could, in an alternative example, be implemented inside an ASIC.

The shortest-path tables described above may be used to select the optimal (shortest or least loaded) path for forwarding traffic on the spanning tree. Furthermore, due to the manner in which the spanning trees are created and the various forwarding tables, load-balancing between links with mismatched speed or unequal costs is enabled. This is an improvement over convention spanning tree protocols that do not send traffic on the shortest path and do not load balance.

The above primarily describes the generation and use of spanning trees for switches through a new method in which the control information is carried and distributed in the source MAC address field of packets. That is, the spanning trees are created within a network by embedding the tree control information (i.e., root identifier, domain, cost, etc.) in the source MAC address of a packet. As such, in contrast to certain conventional arrangements, the control information is carried inside a packet and a header is not added to a packet in order to pass the control information.

It will be appreciated that a switch can be connected to multiple domains. A link is part of one and only one domain. Domain-zero is a domain via which other domains can be reached. Domain-zero is composed of the core devices and is contiguous. Each other domain (i.e., non-zero domains) have connectivity to domain-zero via a domain border switch.

A switch connected to domain-zero, and another domain, is referred to as a domain border switch. A domain border switch will form a tree for domain-zero in all non-zero domains. This tree will have a root-identifier (including domain-identifier) of all zeroes. The tree formation mechanism is the same as described elsewhere herein. A domain border switch will also form a tree for each non-zero domain in domain-zero. The domain-identifier of this tree will be the domain identifier of the non-zero domains and its root identifier will be all zeroes. The tree formation mechanism is same as described elsewhere herein. This technique may also use an assignment of all-zero root-identifiers to a physical switch. All-zero root-identifier based trees represent a tree that allows a device to reach switches located in other domains.

Other aspects described below deal with what occurs when host devices are connected to a group of switches that have been configured with their spanning trees as described above. In such cases, a first host device, referred to as a source, will attempt to send a data packet to a second device, referred to as the destination. As noted above, in order to forward data packets from a source to a destination, the switches in the network will use the MAC address table and the shortest path table. However, before such forwarding can occur, the MAC address tables of each of the switches should be populated so that the switches are aware of the destination and can properly forward the packet. There are two forwarding mechanisms for populating the MAC address table, referred to herein as (1) the MAC-Learning Packet mechanism, and (2) the MAC-in-MAC mechanism.

Figure 8:
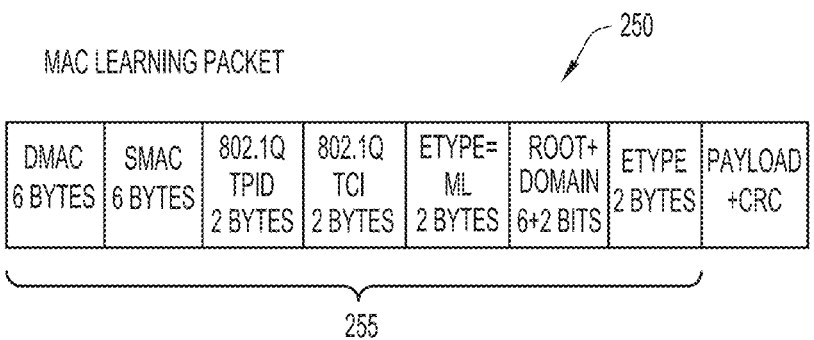
FIG. 8 is schematic diagram of a MAC learning packet used to distribute MAC address information.

In accordance with certain examples described herein, the mechanism referred to as the MAC-Learning packet mechanism is used to learn the MAC addresses on network links. More specifically, as described below, in this mechanism only MAC learning packets and request for MAC learning packets are used to learn the MAC-addresses on a network link (non-edge link). In accordance with a particular example, a packet is received at a first switch via an edge link from a new source (i.e., a source that does not exist in the switch's MAC address table) and which does not have a MAC learning header as described below. This is usually the first packet from this source. In such circumstances, the incoming interface is stored in the MAC address forwarding table and the first switch should inform the other switches in the network of the source MAC address (i.e., the address of the new source). In this example, a new header (MAC learning shim header) is added to the received packet to create a MAC learning packet. FIG. 8 illustrates an example MAC learning packet 250 having a MAC learning header 255. Included in the header 255 of this MAC learning packet 250 is the Root+Domain identifier of the tree of the first switch.

The MAC learning packet 250 is then forwarded on all the links associated with the first switch that have a DF bit set (for the respective tree). Only the first packet carries the header (i.e., only the first packet is the MAC learning packet), but the header may be added to additional packets periodically to refresh the entries in all the switches. In other words, the MAC learning packet 250 is sent when a new host device is connected to a switch, and is used to populate the MAC tables of other switches that are used for future forwarding of packets from the new host device. The packet may also be sent on all other edge links on this switch without any MAC-learning header, if the destination is also unknown. If the destination is known to be connected to an edge link, then the packet will be sent only to that edge link without any MAC-learning header. Otherwise the packet may not be forwarded on any edge link.

When a MAC learning packet 250 (i.e., a packet having the MAC learning shim header) is received by a second switch, the packet will be accepted only if the packet is received on the interface which has a UF bit set for the received Root+Domain identifier. If accepted, the source MAC address of the host device is determined or the age of a previous entry is updated. The Root+Domain identifier is stored in the MAC address table of the second switch. A receiving switch may also choose to save only the root-id in case the receiving switch and packet source are in the same domain, and the receiving switch is not a domain border switch. Similarly the receiving switch may choose to save only the domain-id in case the receiving switch and packet source are in different domains (along with the type of id, either root or domain) and the receiving switch is not a domain border switch. After learning the source MAC, this packet is flooded over all the links with DF bit set for the respective tree with the MAC-learning header intact. If the destination is unknown, the packet may also be sent on all other edge links on this switch without any MAC-learning header. If destination is known to be connected to an edge link, then the packet will be sent only to that edge link without any MAC-learning header. Otherwise the packet may not be forwarded on any edge link.

In accordance with another example, a packet is received from a known source. In such circumstances, the received packet is forwarded based on the destination MAC address using the MAC address table. If the destination is unknown or the packet is a broadcast or multicast packet, the packet it will be flooded on the receiving switch's associated spanning tree using the same method as it was done for an unknown source packet, as described above.

For a known destination, the packet will be forwarded to a known interface if the MAC-address table has an interface stored in the entry. If there is a Root and/or Domain id stored in the MAC-address-table, and domain-id of the entry is same as source interface, then all the entries with DF bit set in the received flags and DFA or UF bit set in the mysent flags in shortest-path table associated with corresponding Root and/or Domain id will be used for performing flow based load balancing on the interfaces. If there is a Root and Domain id stored in the MAC-address-table, and domain-id of the entry is not same as source interface, then no tree for the corresponding root-id will exist. In this case all the entries with DF bit set in the received flags and DFA or UF bit set in the mysent flags in shortest-path table associated with corresponding Domain will be used for performing flow based load balancing on the interfaces. When a new switch joins, all the other switches will learn the new root identifier. When a new root identifier is learned, all switches will send MAC learning packets for all the MACs learned on edge ports with the next first incoming packet on the edge port. This will allow the newly booted up switch to learn the MAC addresses without requesting MAC learning packets from all devices.

In summary of FIG. 8, the MAC learning packet 250 is the only packet that is used to learn MAC addresses on non edge links (i.e., on network links). In operation, the MAC learning packet 250 is flooded on all the links with DF bit set on mysentflags of the link for the associated tree. It is also noted that generally only the first packet, and not all packets, carry the MAC learning header 255.

In a still other example, a first packet from a new source (i.e., a source which does not exist in its MAC address table) or from an unknown destination (i.e., destination which does not exist in its MAC address table) is received on a network link that does not include the above noted MAC learning header. In other words, a switch may receive a packet that has a destination that is not known by the switch (i.e., the destination is not in the current switch's MAC address table) and that does not include the above noted MAC learning header 255.

Figure 9:
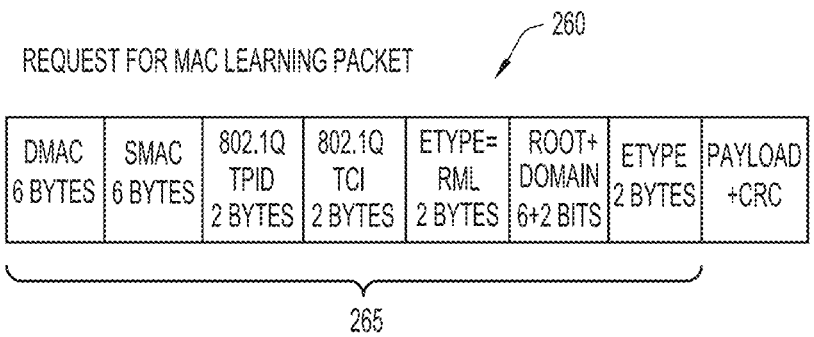
FIG. 9 is a schematic diagram of a request for MAC learning packet used to obtain MAC address information.

In order to obtain the path to destination MAC address and to forward this packet to its destination, this packet is modified to include a Request for MAC learning shim header to convert the packet into a Request for MAC learning packet. An example Request for MAC learning packet 260 is shown in FIG. 9 and includes an example Request for MAC learning header 265. This Request for Mac-Learning shim header 265 will contain the Root and Domain id of the tree of this switch. This request for Mac-learning packet will be forwarded on all the links with DF bit set of the respective Tree.

When a Request for MAC learning packet 260, this packet will be processed in substantially the same way as a Mac-Learning Packet. If the destination is known to be connected to edge link of the receiving switch, then the receiving switch will be programmed such that next packet sourced from this destination MAC will be sent with the Mac-Learning shim header.

In certain examples, traffic forwarding occurs across domains using the MAC-Learning packet mechanism. In such examples, the domain border switch will forward the MAC-learning packet from a non-zero domain to domain-zero, and vice-versa. The packet will be flooded over the zero root-id based tree for the source domain in the destination domain.

FIGS. 8 and 9 have been described with reference to the use of a MAC learning header and a Request for MAC learning header in order to distribute/obtain unknown MAC addresses. The use of such headers is only an example of different methods that may be used to distribute the MAC address information. In another example, instead of using the two different headers (i.e., MAC learning header and Request for MAC learning header), an encapsulated MAC concept may be employed. This encapsulated MAC concept is referred to herein as MAC-in-MAC and is described with reference to FIGS. 10 and 11.

Figure 10:
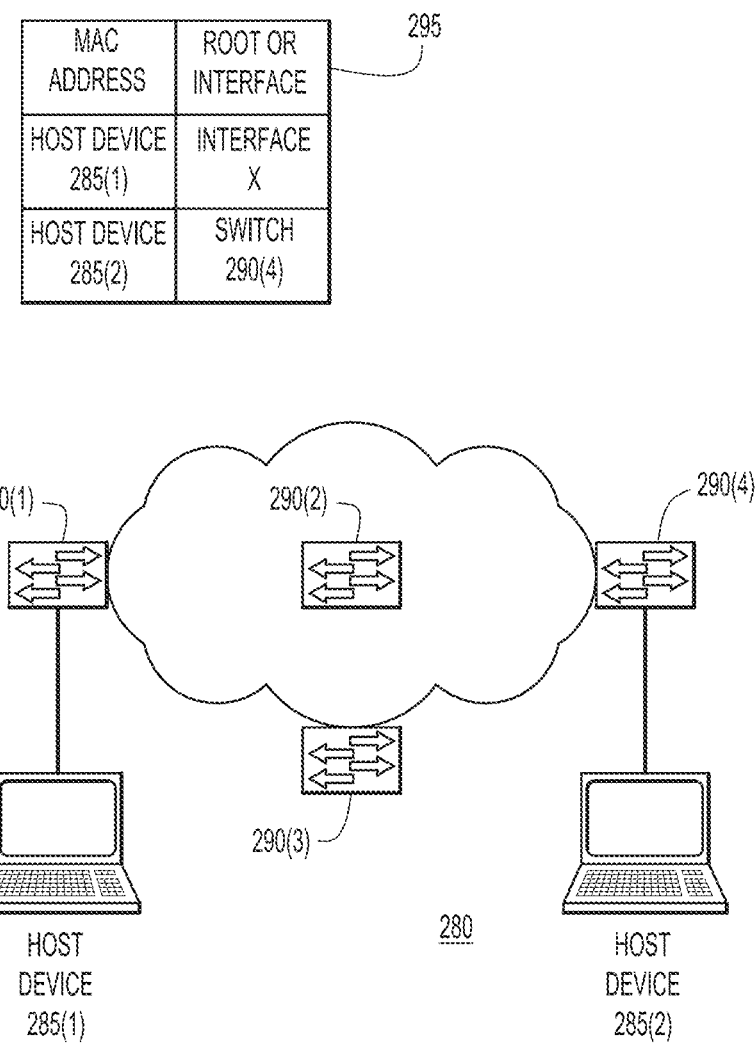
FIG. 10 is a block diagram of a computing network illustrating the use of MAC-in-MAC encapsulation techniques.

FIG. 10 is a block diagram of a packet switching computer network 280 executing MAC-in-MAC techniques. Similar to network 10 of FIG. 1, network 280 comprises a first host device 285(1), a second host device 285(2), and a plurality of switches 290(1)-290(4). Switches 290(1), 290(3), and 290(4) are edge switches (i.e., support edge links), while switch 290(2) is a core switch. Edge switches 290(1), 290(3), and 290(4) will each have an associated MSPT-based spanning tree, as described above, where each of the switches is the root for its spanning tree. That is, the control information may be distributed as described above through control packets having the formatted source MAC address field. In this specific example, core switch 290(2) does not have an associated spanning tree because it is within the core of the network (i.e., does not have an edge link) and thus will not be a destination for packets.

Host device 285(1) is, in this example, attempting to send packets to host device 285(2). As such, the source address for the packets is the MAC address of host device 285(1) and the destination address for the packets is the MAC address of host device 285(2). As such, switch 290(1) has a MAC address table 295 stored therein.

A first packet is received at switch 290(1). Because the control information was already populated, switch 290(1) determines that host device 285(2) is reachable via switch 290(4). As such, switch 290(1) determines the optimal path to switch 290(2) using a shortest-path table. Next, switch 290(1) will then encapsulates the packet using MAC-in-MAC techniques. In the MAC-in-MAC forwarding technique, the source and destination MAC address of the outer Ethernet header has embedded therein the source and destination switch's root (switch) and domain identifier, respectively. That is, embedded in the source address and destination address are the Root+Domain identifiers that are switches directly connected to the source and destination, respectively. If there is a Root and/or Domain id stored in the MAC-address-table, and the domain-id of the entry is the same as source interface, then all the entries with DF bit set in the received flags and DFA or UF bit set in the mysent flags in the shortest-path table associated with the corresponding Root and/or Domain id will be used for performing flow based load balancing on the interfaces. If there is a Root and Domain id stored in the MAC-address-table, and the domain-id of the entry is not same as source interface, then no tree for the corresponding root-id will exist. In this case, all the entries with DF bit set in the received flags and DFA or UF bit set in the mysent flags in the shortest-path table associated with corresponding domain will be used for performing flow based load balancing on the interfaces.

In this arrangement, switch 290(2) does not learn any MAC addresses. Rather, after receipt of the packet, switch 290(2) merely forwards the packet using the destination root+domain identifier embedded in the destination MAC address. If there is a Root and/or Domain id stored in the MAC-address-table, and the domain-id of the entry is same as source interface, then all the entries with DF bit set in the received flags and DFA or UF bit set in the mysent flags in the shortest-path table associated with the corresponding Root and/or Domain id will be used for performing flow based load balancing on the interfaces. If there is a Root and Domain id stored in the MAC-address-table, and the domain-id of the entry is not same as source interface, then no tree for the corresponding root-id will exist. In this case all the entries with DF bit set in the received flags and DFA or UF bit set in the mysent flags in the shortest-path table associated with the corresponding domain will be used for performing flow based load balancing on the interfaces.

FIG. 10 illustrates an example where the packet received by switch 290(1) is specifically directed to a destination that is known to switch 290(1). In other circumstances, the destination may be unknown or the packet may be a broadcast or multi-cast packet. In such circumstances, switch 290(1) encapsulates the packet with a MAC-in-MAC source address. The encapsulating header's (outer header) source address will have the embedded source root and domain identifier. The encapsulation of the destination address, however, is the same as the original packet. When switch 290(2) receives the packet, switch 290(2) will not know the destination MAC (doesn't learn it) then the packet will be checked if the packet is received on the interface which has a UF bit set for the received root+domain identifier in the source MAC. If not, then the packet will be dropped. If so, then the packet will be flooded on all the links with DF bit set in mysentflags for spanning tree associated with root+domain identifier embedded in the source address. The flood reaches switch 290(4) and switch 290(4) decapsulates and forwards the packet to host device 285(2). Switch 290(4) also learns the MAC address of host device 285(1) and associates it with the root+domain identifier embedded in the encapsulating header's source address. Similarly switch 290(3) may block the packet if the destination address of 285(2) is known and is not connected to the switch. Otherwise, switch 290(3) will flood the packet on all edge links after decapsulating the outer Ethernet header. Switch 290(3) also learns the MAC address of host device 285(1) and associates it with the root identifier embedded in the encapsulating source address.

Figure 11:
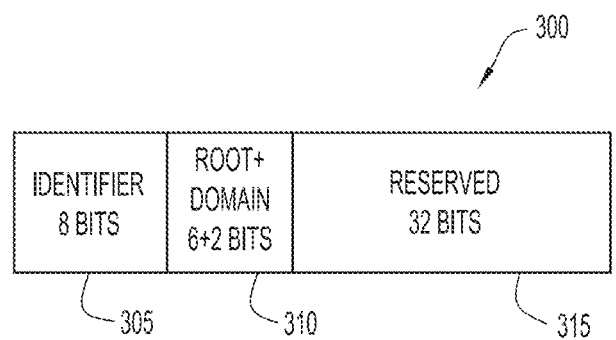
FIG. 11 is schematic diagram of a MAC address field having an embedded root identifier in accordance with MAC-in-MAC encapsulation techniques.

FIG. 11 illustrates an example MAC address 300 (i.e., source or destination MAC address) formatted in accordance with MAC-in-MAC so as to include an embedded root identifier. More specifically, MAC address 300 includes an eight (8) bit identifier 305 that identifies the packet as MAC address packet for MAC-in-MAC traffic forwarding. The identifier indicates to a later receiving switch that the MAC address 300 should not be stored in its MAC address table.

MAC address 310 also includes an eight (8) bit root+domain identifier in which the first six (6) bits identify the root and the remaining two (2) bits identify the domain of the switch. Finally, a segment 315 includes thirty-two (32) bits that are not used.

In certain examples, traffic forwarding occurs across domains using the MAC-in-MAC mechanism. In such examples, the domain border switch will forward the MAC-in-MAC packet from a non-zero domain to domain-zero, and vice-versa. The packet will be flooded over the zero root-id based tree for the source domain in the destination domain.

In summary of FIGS. 10 and 11, MAC-in-MAC is an alternative to the use of the MAC learning and Request for MAC learning headers. In both alternatives, the control information is still distributed as described above (source MAC).

In the MAC-in-MAC forwarding techniques, a packet may be flooded, broadcast, multicast, etc., by a first switch. This type of multi-destination forwarding occurs from the first switch along the spanning tree created for that switch. More specifically, when a multi-destination packet is forwarded from a first switch to a second switch, the second switch will examine the source address (e.g., source MAC address) in the received packet. The source address in the received packet identifies the host device (source) of the packet and, indirectly, identifies the root of the spanning tree that is being used to forward the packet. As such, because of the configuration described above, other bits in the frame are not used to identify the spanning tree for packet forwarding, but rather only the source address. That is, the source address is used to identify the tree a packet belongs to, and where to flood the packet (i.e., which tree to flood).

Figure 13:
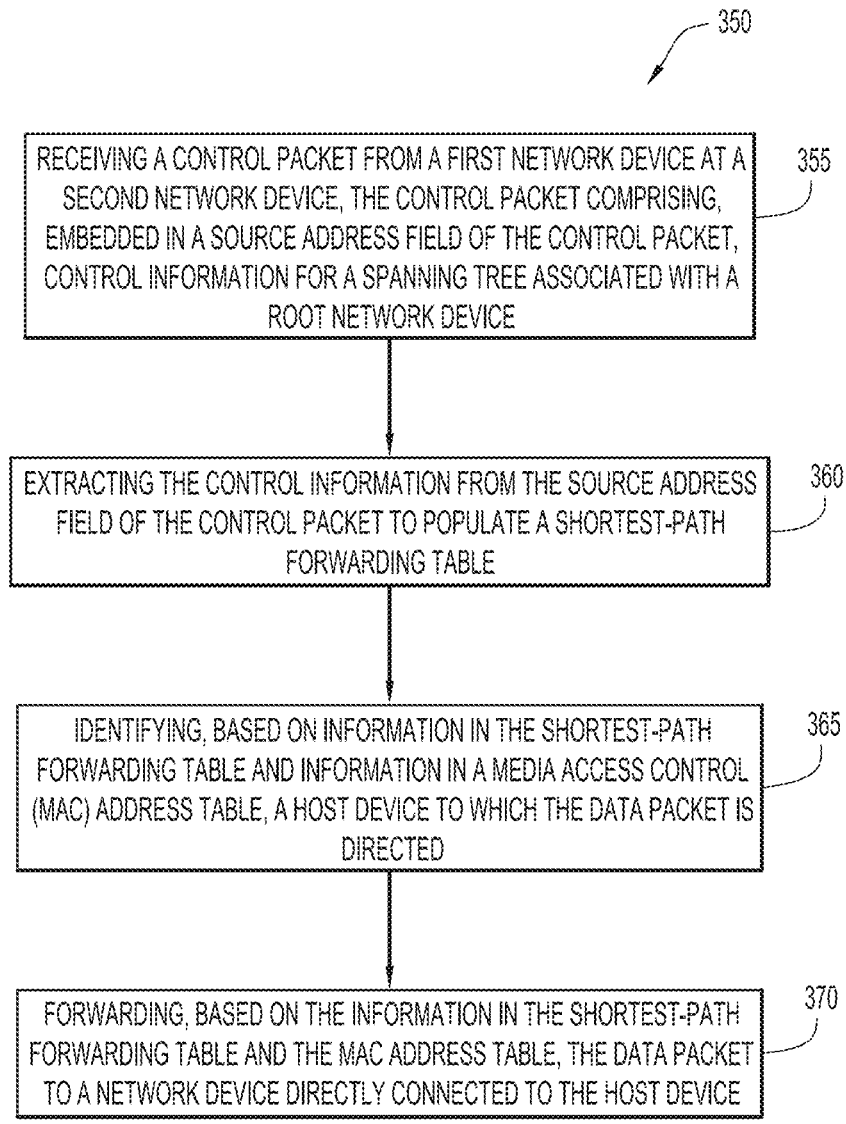
FIG. 13 is a high-level flowchart of a method that may be executed in accordance with examples described herein.

FIG. 13 is a high-level flowchart of a method 350 that may be executed in accordance with examples described herein. At 355, a control packet is received from a first network device at a second network device. The control packet comprises, embedded in a source address field of the control packet, control information for a spanning tree associated with a root network device. At 360, the control information is extracted from the source address field of the control packet to populate a shortest-path forwarding table. At 365, a data packet is received from the first network device at the second network device. At 370, based on information in the shortest-path forwarding table and information in a media access control (MAC) address table, a host device to which the data packet is directed is identified by the second network device. At 375, based on the information in the shortest-path forwarding table and the MAC address table, the data packet is forwarded to a network device directly connected to the host device.

The above description is intended by way of example only.

What is claimed is:

1. A method comprising:
receiving a control packet generated by a first network device at a second network device, wherein the control packet comprises, embedded in a source address field of the control packet, control information for a spanning tree associated with a root network device;
extracting the control information from the source address field of the control packet to populate a shortest-path forwarding table;
receiving a data packet from the first network device at the second network device;
identifying, based on information in the shortest-path forwarding table and information in a media access control (MAC) address forwarding table, a host device to which the data packet is directed; and
forwarding, based on the information in the shortest-path forwarding table and the MAC address forwarding table, the data packet to a network device directly connected to the host device.

2. The method of claim 1, further comprising:
receiving the control packet from the first network device that includes a root+domain identifier for the root network device embedded in the source address field; and
storing the root+domain identifier in the shortest-path forwarding table.

3. The method of claim 1, further comprising:
receiving the control packet from the first network device that includes a cost embedded in the source address field, wherein the cost indicates the cost to reach the root network device from the first network device; and
storing the cost in the shortest-path table as a received cost.

4. The method of claim 1, further comprising:
receiving the control packet from the first network device that includes a plurality of flags embedded in the source address field, wherein the flags indicate the network relationship of the first network device relative to the root network device; and
storing the flags in the shortest-path table as myreceived flags.

5. The method of claim 4, further comprising:
forwarding the control packet to at least an additional network device;
modifying the flags in the control packet prior to forwarding the control packet to the additional network device in order to indicate the relationship of the second network device to the root network device; and
storing the modified flags in the shortest-path table as mysent flags.

6. The method of claim 1, further comprising:
calculating a cost to reach the root network device from the second network device; and
storing the calculated cost in a sent cost table.

7. The method of claim 1, further comprising:
receiving the control packet from the first network device that includes a bridge identifier embedded in the source address field, wherein the bridge identifier indicates a sending bridge; and
storing the bridge identifier in the shortest-path table.

8. The method of claim 1, further comprising:
adding a MAC learning shim header to a data packet received from a new source to form a MAC-learning packet, wherein the MAC learning shim header has a source MAC address of the new source embedded therein; and
forwarding the MAC-learning packet to one or more additional network devices each having an associated MAC address forwarding table, wherein the MAC-learning packet is used by the one or more additional network devices for populating their respective MAC address forwarding tables to include the source MAC address.

9. The method of claim 1, further comprising:
encapsulating a received data packet to with an Ethernet header that has embedded therein a source and destination network device root and domain identifier to form a MAC-in-MAC packet; and
forwarding the MAC-in-MAC packet to one or more additional network devices each having an associated MAC address forwarding table, wherein MAC-learning packet is used by the one or more additional network devices for populating their respective MAC address forwarding tables to include the source MAC address.

10. One or more non-transitory computer readable storage media encoded with software comprising computer executable instructions and when the software is executed operable to:
receive a control packet generated by a first network device at a second network device, wherein the control packet comprises, embedded in a source address field of the control packet, control information for a spanning tree associated with a root network device;
extract the control information from the source address field of the control packet to populate a shortest-path forwarding table;
receive a data packet from the first network device at the second network device;
identify, based on information in the shortest-path forwarding table and information in a media access control (MAC) address forwarding table, a host device to which the data packet is directed; and
forward, based on the information in the shortest-path forwarding table and the MAC address forwarding table, the data packet to a network device directly connected to the host device.

11. The non-transitory computer readable storage media of claim 10, further comprising instructions operable to:
receive the control packet from the first network device that includes a root+domain identifier for the root network device embedded in the source address field; and store the root+domain identifier in the shortest-path forwarding table.

12. The non-transitory computer readable storage media of claim 10, further comprising instructions operable to:
receive the control packet from the first network device that includes a cost embedded in the source address field, wherein the cost indicates the cost to reach the root network device from the first network device; and
store the cost in the shortest-path table as a received cost.

13. The non-transitory computer readable storage media of claim 10, further comprising instructions operable to:
receive the control packet from the first network device that includes a plurality of flags embedded in the source address field, wherein the flags indicate the network relationship of the first network device relative to the root network device; and
store the flags in the shortest-path table as myreceived flags.

14. The non-transitory computer readable storage media of claim 13, further comprising instructions operable to:
forward the control packet to at least an additional network device;
modify the flags in the control packet prior to forwarding the control packet to the additional network device in order to indicate the relationship of the second network device to the root network device; and
store the modified flags in the shortest-path table as mysent flags.

15. The non-transitory computer readable storage media of claim 10, further comprising instructions operable to:
calculate a cost to reach the root network device from the second network device; and
store the calculated cost in a sent cost table.

16. The non-transitory computer readable storage media of claim 10, further comprising instructions operable to:
receive the control packet from the first network device that includes a bridge identifier embedded in the source address field, wherein the bridge identifier indicates a sending bridge; and
store the bridge identifier in the shortest-path table.

17. The non-transitory computer readable storage media of claim 10, further comprising instructions operable to:
add a MAC learning shim header to a data packet received from a new source to form a MAC-learning packet, wherein the MAC learning shim header has a source MAC address of the new source embedded therein; and
forward the MAC-learning packet to one or more additional network devices each having an associated MAC address forwarding table, wherein the MAC-learning packet is used by the one or more additional network devices for populating their respective MAC address forwarding tables to include the source MAC address.

18. The non-transitory computer readable storage media of claim 10, further comprising instructions operable to:
encapsulate a received data packet to with an Ethernet header that has embedded therein a source and destination network device root and domain identifier to form a MAC-in-MAC packet; and
forward the MAC-in-MAC packet to one or more additional network devices each having an associated MAC address forwarding table, wherein MAC-learning packet is used by the one or more additional network devices for populating their respective MAC address forwarding tables to include the source MAC address.

19. An apparatus comprising:
a plurality of network interfaces;
a memory; and
a processor coupled to the network interfaces and memory, and configured to:
receive a control packet generated by a first network device, wherein the control packet comprises, embedded in a source address field of the control packet, control information for a spanning tree associated with a root network device;
extract the control information from the source address field of the control packet to populate a shortest-path forwarding table;
receive a data packet from the first network device;
identify, based on information in the shortest-path forwarding table and information in a media access control (MAC) address forwarding table, a host device to which the data packet is directed; and
forward, based on the information in the shortest-path forwarding table and the MAC address forwarding table, the data packet to a network device directly connected to the host device.

20. The apparatus of claim 19, wherein the processor is further configured to:
receive the control packet from the first network device that includes a plurality of flags embedded in the source address field, wherein the flags indicate the network relationship of the first network device relative to the root network device; and
store the flags in the shortest-path table as myreceived flags.

21. The apparatus of claim 20, wherein the processor is further configured to:
forward the control packet to at least an additional network device;
modify the flags in the control packet prior to forwarding the control packet to the additional network device in order to indicate the relationship of the second network device to the root network device; and
store the modified flags in the shortest-path table as mysent flags.

22. The apparatus of claim 19, wherein the processor is further configured to:
add a MAC learning shim header to a data packet received from a new source to form a MAC-learning packet, wherein the MAC learning shim header has a source MAC address of the new source embedded therein; and
forward the MAC-learning packet to one or more additional network devices each having an associated MAC address forwarding table, wherein the MAC-learning packet is used by the one or more additional network devices for populating their respective MAC address forwarding tables to include the source MAC address.

23. The apparatus of claim 19, wherein the processor is further configured to:
encapsulate a received data packet to with an Ethernet header that has embedded therein a source and destination network device root and domain identifier to form a MAC-in-MAC packet; and
forward the MAC-in-MAC packet to one or more additional network devices each having an associated MAC address forwarding table, wherein MAC-learning packet is used by the one or more additional network devices for populating their respective MAC address forwarding tables to include the source MAC address.

* * * * *